United States Patent

Ortner et al.

Patent Number: 5,518,580
Date of Patent: May 21, 1996

[54] METHOD OF PROCESSING PRINTED WASTE MATTER

[75] Inventors: Herbert Ortner; Hans-Dieter Dorflinger, both of Heidenheim, Germany

[73] Assignee: J.M. Voith GmbH, Germany

[21] Appl. No.: 293,572

[22] Filed: Aug. 22, 1994

Related U.S. Application Data

[63] Continuation of Ser. No. 50,474, May 18, 1993, abandoned.

[30] Foreign Application Priority Data

Sep. 20, 1991 [DE] Germany ............ 41 31 308.9
Oct. 11, 1991 [DE] Germany ............ 41 33 683.6

[51] Int. Cl.⁶ .................. D21C 5/02; D21B 1/32
[52] U.S. Cl. ............... 162/4; 162/5; 162/55; 241/28
[58] Field of Search ............ 162/4, 5, 55; 241/24, 241/28

[56] References Cited

U.S. PATENT DOCUMENTS

| | | |
|---|---|---|
| 3,891,497 | 6/1975 | Daane et al. . |
| 4,334,984 | 6/1982 | Vagac et al. ............... 162/4 |
| 4,780,179 | 10/1988 | Clement ................. 162/5 |
| 4,999,084 | 3/1991 | Lang et al. ............... 162/4 |

FOREIGN PATENT DOCUMENTS

| | | |
|---|---|---|
| 0092124 | 10/1983 | European Pat. Off. . |
| 0354307 | 2/1990 | European Pat. Off. . |
| 0398846 | 11/1990 | European Pat. Off. . |
| 2517713 | 6/1983 | France . |
| 2413278 | 9/1975 | Germany . |
| 0904279 | 8/1962 | United Kingdom . |
| 1429626 | 3/1976 | United Kingdom . |
| 2033784 | 5/1980 | United Kingdom . |

OTHER PUBLICATIONS

Das Papier; J. Bruckner "dispergierung"; vol. 42, No. 10, Oct. 1988, pp. 547–550.

Primary Examiner—Karen M. Hastings
Attorney, Agent, or Firm—Ostrolenk, Faber, Gerb & Soffen

[57] ABSTRACT

The present invention relates to a method of processing printed waste paper, in particular waste paper containing at least 80% newsprint or magazine paper by digestion, various cleaning steps, flotation or washing and disintegrating, the latter with a high consistency of at least 20%, and possibly bleaching. The invention is characterized by the fact that a final second disintegrating step, arranged possibly before a bleaching step, with treatment of the waste paper under strong kneading action of individual bar-shaped or block-shaped kneading elements of both the stator and the rotor of the disintegrating machine which are arranged in a kneading chamber thereof which is delimited by two concentric cylindrical surfaces, at temperatures between 20° and 110° C., and preferably 38° to 65° C., and with a specific power consumption of between 30 and 100, and preferably 80, kilowatt hours/ton oven-dried pulp.

12 Claims, 2 Drawing Sheets

METHOD OF PROCESSING PRINTED WASTE MATTER

This is a Continuation of application Ser. No. 08/050,474 filed on May 18, 1993, now abandoned.

BACKGROUND OF THE INVENTION

The use of deinked waste paper as a fiber component constitutes prior art in the manufacture of newsprint, copy papers, sanitary papers and board.

The object of the present invention is also the use of deinking substances for high-grade printing papers such as, for instance, coating base papers, LWC and SC papers (rotogravure and offset printing). For these cases of use, both a high degree of cleanness as well as a high degree of whiteness is necessary. If it is possible to produce deinked materials of the required quality, the demand will be correspondingly high, i.e. desired clean types of waste paper will not be available in sufficient quantity. It will then be necessary to have recourse to so-called "household collected waste" consisting of about 40 to 60% old newspapers and 60 to 40% illustrated magazines. The deinking process must therefore be designed for this waste paper.

The method which is today preferred for newspaper deinking substance employs, in addition to various hydrocyclones used in the cleaning steps and screen sorting, and flotation, as shown by the first steps of FIG. 1. It is based on a method proposed for so-called SC papers, such as has already been discussed. It has been reported on also in the trade press. By this method, deinked pulps of a high degree of whiteness and good cleanness can be produced. Depending on the waste paper employed, it may, however, be that the cleanness is not sufficient for these high-grade printing papers, i.e. that the deinked waste paper may for example contain more dirt flecks than, for instance, the ground wood pulp used at the same time as fiber component.

Based on tests, a comparison between ground wood and a deinking pulp which was simultaneously bleached in the dispersing apparatus and then floated shows that while this pulp is good for the production of newsprint, it is not good for high-grade printing papers.

As a dispersing machine, there are customarily used disk disintegrating machines, particularly in order so to reduce the size of disturbing sticking substances and divide them up below the limit of visibility that they no longer disturb the paper production process.

For homogenizing of color particles, so-called single-shaft disintegrators are also known, particularly in processing plants for the production of board (Voith Reprint 2066; Wochenblatt für Papierfabrikation, No. 23/24 (1977), 981–985).

SUMMARY OF THE INVENTION

The object is to prepare a waste paper pulp from deinked waste paper which has a degree of whiteness suitable for use in high-grade printing papers.

The particles of ink/dirt are so dispersed and homogenized in the second disintegrating-dispersion step that the waste paper pulp which has been treated in this manner satisfies the high demands made as to cleanness on super-calendered types of paper for rotary, offset or rotogravure printing. As second disintegrating machine, possibly provided after the second thickening-dewatering step, a disk disintegrator may be used. A disk disintegrator can also be used for the first dispersion step. A so-called single-shaft disintegrator may also be used as the second disintegrating machine. The single-shaft disintegrator has individual rod-shaped or block-shaped kneading elements both on the rotor and on the stator, arranged in a kneading chamber delimited by two concentric cylindrical surfaces.

A paper base material is obtained which has the required cleanness values for coating base papers of the quality of LWC and SC papers (for instance for rotogravure or offset printing). The whiteness and brightness also satisfy the demands with regard thereto.

A multistep refiner known from EP 0 122 868-A1 serves only for the purpose of improving, in the case of low consistency, the pulp parameters of wood pulp, such as dewaterability and strength.

The following table shows the measured values after the different process steps and those for wood pulp.

All measurements were carried out with a TASS-Plus Image Analysis apparatus of the LEITZ Company.

| Particle Size f (mm$^2$) >0.04 | 0.001 < f < 0.04 | Visual Percentage of Black (%) |
|---|---|---|
| Before Z 61 | 2560 | 1.02 |
| Z I *1) | 38 | 1876 0.63 |
| Additional F | 14 | 1412 0.44 |
| Z II *2) | 20 | 1400 0.5 |
| Z II *1) | 16 | 1275 0.45 |
| Z I *1) | 38 | 1876 0.63 |
| Z II *1) | 17 | 1482 0.49 |
| Additional F II | 6 | 936 0.30 |
| Z II *2) | 22 | 1620 0.51 |
| Additional F II | 10 | 1160 0.39 |
| Wood pulp | 12 | 1164 0.36 |

*1): Dispersing with disk disintegrator.
*2): Dispersing with single-shaft disintegrator.

BRIEF DESCRIPTION OF THE DRAWINGS

The invention will be explained below with reference to the figures in the drawing.

DETAILED DESCRIPTION OF PREFERRED EMBODIMENTS

In the diagrams for the processing of waste paper, the following abbreviations are used:

| | |
|---|---|
| P | dissolving, generally in the pulper |
| R | prepurification, |
| S | presorting, |
| F | flotation, |
| FR | fine cleaning |
| FS | fine sorting, |
| D | thickening (dewatering and/or washing), |
| Z | dispersing (disintegrating), |
| B | bleaching. |

Figure 2:
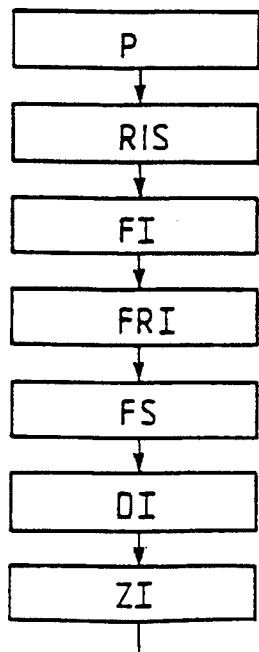
FIG. 2 is a basic diagram of the processing method of the invention.
Figure 2:
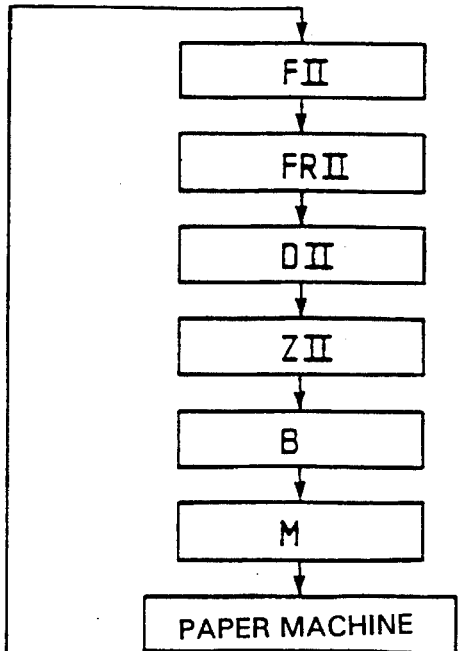

In accordance with the invention, a double flotation, namely FI and FII, and a double dispersing ZI and ZII are provided, as shown in FIG. 2. The fine cleaning takes place in this connection generally in hydrocyclones, which are frequently also referred to as cleaners. For the fine sorting, screen sorters with screening baskets are used which have either a screening holes or notch-shaped screening perforations. The corresponding dimensions of the perforations are generally known to those skilled in the art. The chemical formulas for the flotation, bleaching and dispersing are also known.

A so-called dispersing bleaching is preferably carried out in the first disintegrating step ZI, the following formula offering itself, in each case in percent, referred to oven-dried waste paper: $H_2O_2$ (100%) 0.5–1.5, sodium silicate (37 B é) 1.1, NaOH (100%) 0.3. The consistency of the pulp is at least 20% and preferably between 24 and 30%. The bleaching time is about 3 minutes and the processing temperature in this apparatus is preferably between 75° and 95° C. Furthermore, there also enter into consideration as addition DTPA (40% solution) 0.3 to 0.5, collector 0.5, flotation aid 0.5. The latter chemicals can, however, also be added behind the disintegrator in a mixing vat or to the mixing container of the flotation plant.

Instead of the first flotation step FI, a washing step can also be employed. One preferably operates without the addition of steam in the second disintegrating step, in the single-shaft disintegrator. In general, the temperature during the second disintegrating step is between 20° and 110° C. or 120° C. and at most 140° C., but the operating temperature of about 40° C. can also be used, so that one can accept 38° to 85° C. as range to be recommended. The specific power required in the second disintegrating step is between 30 and 100 preferably between 30 and 80 kilowatt hours per ton oven dried pulp. The above temperature ranges and power consumption ranges can also be applied to the first defibering and disintegrating step.

One can operate at the above-indicated temperatures also with application of pressurized gas (air or nitrogen, for instance) of, for example, 1.4 bar, and therefore without steam of corresponding high pressure—at temperatures as from 100° C.—in the dispersing machines, and particularly also in the single-shaft disintegrator.

A final bleaching step can be carried out as a hydrosulfite bleaching, for instance with sodium dithionite, or a peroxide bleaching can be used in both bleaching steps. One can also proceed conversely in case of the different bleaching chemicals.

The second flotation step FII can also possibly be omitted if the quality of the waste paper permits this. In such case, one would have two pulping or dispersing steps ZI and ZII being carried out one directly after the other.

Between the two disintegrating machines on can also use, in addition to a bleaching, various cleaning steps, also combined or in series, such as, for instance, a cleaner plant and/or washing in order, depending on the composition of the particles of dirt which are dissolved out as well as their size and weight, to remove the corresponding percentage of particles of dirt based on the cleaning plant already used.

It is most advantageous then or else otherwise in most cases to provide a subsequent flotation step FII (see table).

Figure 1:
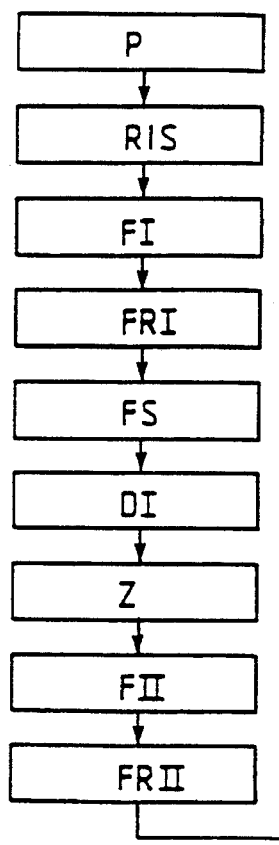
FIG. 1 shows a known basic diagram.
Figure 3:
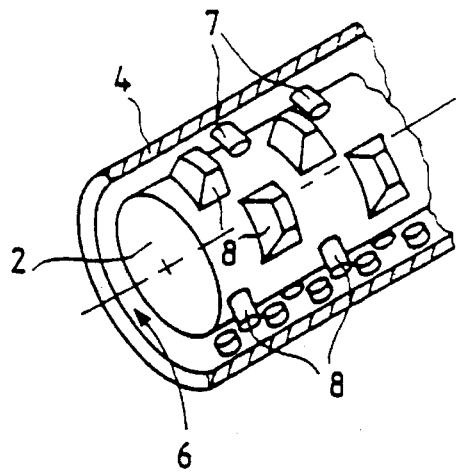
FIG. 3 is a sketch of a single-shaft disintegrator.
Figure 3:
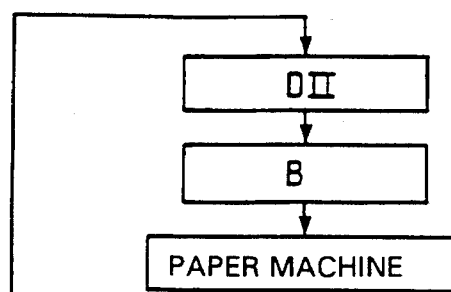

The width of the kneading chamber 6 of the single-shaft disintegrator shown in FIG. 3 is preferably at least 30 mm and can amount to up to 80 mm and more, while the length of the kneading chamber (length of the generatrices of the cylindrical surfaces) is generally at least 60 cm. The width of the kneading chamber can vary depending on the quantitative throughput. In FIG. 3, the bar-shaped kneading elements (short cylindrical pieces) of the rotor 2 are designated 8 and the mating elements of approximately the same shape of the stator 4 are designated 7. The elements of the rotor, in particular, can also be of approximately block or pyramidal shape, as indicated by 8' in the upper part of the figure.

Figure 5:
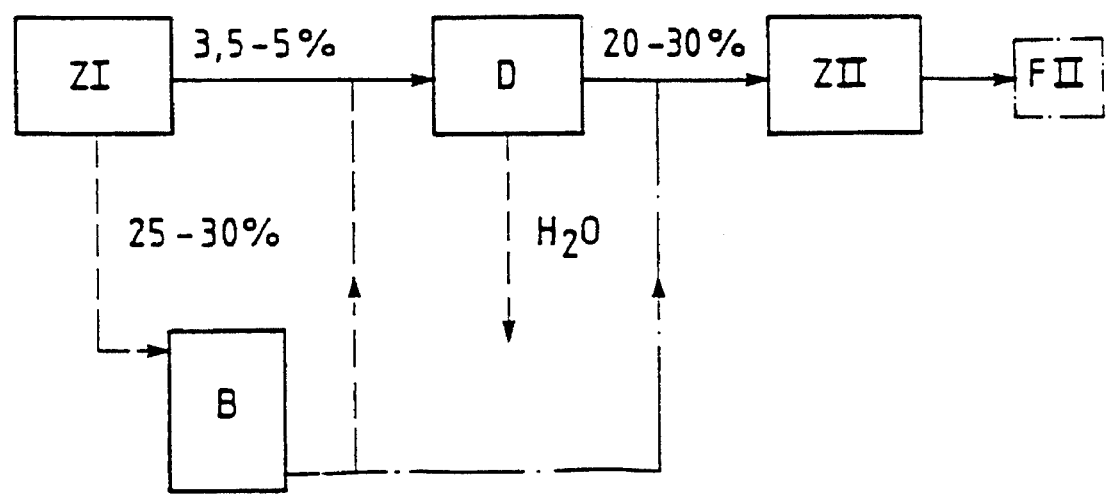
FIG. 5 is a basic diagram with various further variants.

In accordance with FIG. 5, different switching variants are possible, the consistency values or ranges being indicated on the lines. The bleaching B in the tower results in the advantage that a swelling of the paper fibers which is favorable for the following dispersion apparatus is effected. The bleaching time is between 20 and 120 minutes.

Figure 4:
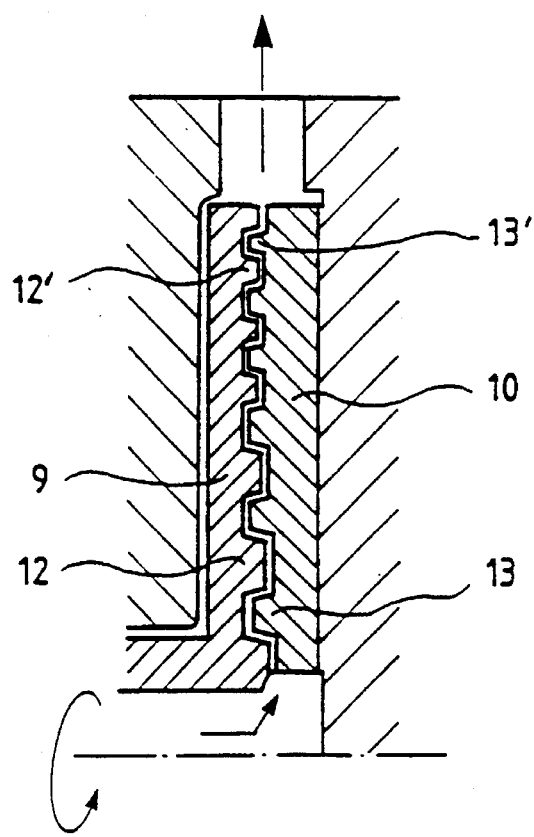
FIG. 4 is a basic diagram of a disk disintegrator.

The disks of the disk disintegrator shown in FIG. 4 can preferably have tooth-shaped, block-shaped or hump-shaped defibrillation elements. The slot widths are within the customary range and amount to between 0.5 and 12 mm, this being greatly dependent on the specific power consumption. A further influence consists of the nature of the pulp (such as degree of beating) and the addition of chemicals. The specific power consumption is also preferably 60 to 80 kilowatt hours per ton oven-dried pulp. The blocks (teeth) of the rotor disk 9 and of the stator disk 10 which cooperate in the manner shown in FIG. 4 have, for instance, a height of between 8 and 12 mm and a width and thickness of between 8 and 15 mm. In this connection, the radially inner teeth 12, 13 are stronger than the outer teeth 12', 13'.

We claim:

1. A method for reprocessing used printed paper, the method comprising the steps of:
    a) dissolving the paper into pulp;
    b) initially cleaning the pulp;
    c) one of floating and washing the pulp after the step of initially cleaning;
    d) a first step of disintegrating and defibering the pulp using a disk disintegrator;
    e) a second step of disintegrating and defibering the pulp by treating the pulp with a strong kneading action using a single-shaft disintegrator, the second step of disintegrating and defibering occurring after the first step of disintegrating and defibering.

2. The method of claim 1, further comprising the step of bleaching the pulp after the second step of disintegrating and defibering.

3. The method of claim 2, further comprising the steps of fine cleaning the pulp and one of sorting and screening the pulp between the first and second steps of disintegrating and defibering.

4. The method of claim 3, further comprising the step of floating the pulp before the step of fine cleaning and after the first step of disintegrating and defibering.

5. The method of claim 2, further comprising the step of floating the pulp after the first step of disintegrating and defibering and before the second step of disintegrating and defibering.

6. The process of claim 3, wherein the temperature at the second disintegrating and defibering step is in the range between 38° and 65° C.

7. The method of claim 3, wherein the operational consumption at the second disintegrating and defibering step is between 30 and 80 kilowatt hours per ton oven-dried pulp.

8. The method of claim 1, wherein the kneading action is performed by kneading elements on a stator or on a rotor, the method comprising rotating the rotor with respect to the stator for causing the kneading elements to knead the pulp.

9. The method of claim 8, wherein the first step of disintegrating and defibering is performed at a consistency of at least 20% and the second step of disintegrating and defibering is performed at temperatures in a range between 20° and 140° C. and at an operational consumption of between 30 and 100 kilowatt hours per ton of oven-dried pulp.

10. The method of claim 1, wherein the first and second steps of disintegrating and defibering occur successively without any additional pulp floating step occurring therebetween.

11. The method of claim 1, wherein the second disintegrating and defibering step additionally comprises a dispersing step.

12. The method of claim 1, further comprising the step of floating the pulp following the first and second steps of disintegrating and defibering.

* * * * *